(12) United States Patent
Rao et al.

(10) Patent No.: US 11,455,502 B2
(45) Date of Patent: Sep. 27, 2022

(54) LEARNING DEVICE, CLASSIFICATION DEVICE, LEARNING METHOD, CLASSIFICATION METHOD, LEARNING PROGRAM, AND CLASSIFICATION PROGRAM

(71) Applicant: Rakuten Group, Inc., Tokyo (JP)

(72) Inventors: Kobagapu Bhaskar Rao, Setagaya-ku (JP); Yeongnam Chae, Setagaya-ku (JP)

(73) Assignee: RAKUTEN GROUP, INC., Tokyo (JP)

( * ) Notice: Subject to any disclaimer, the term of this patent is extended or adjusted under 35 U.S.C. 154(b) by 427 days.

(21) Appl. No.: 16/635,567

(22) PCT Filed: May 31, 2019

(86) PCT No.: PCT/JP2019/021679
§ 371 (c)(1),
(2) Date: Jan. 31, 2020

(87) PCT Pub. No.: WO2020/240809
PCT Pub. Date: Dec. 3, 2020

(65) Prior Publication Data
US 2021/0406615 A1  Dec. 30, 2021

(51) Int. Cl.
*G06K 9/00* (2022.01)
*G06K 9/62* (2022.01)
(Continued)

(52) U.S. Cl.
CPC ........... *G06K 9/6268* (2013.01); *G06K 9/628* (2013.01); *G06K 9/6232* (2013.01); *G06N 3/08* (2013.01); *G06V 10/22* (2022.01)

(58) Field of Classification Search
CPC .... G06K 9/6268; G06K 9/6232; G06K 9/628; G06K 9/00; G06N 3/08; G06V 10/22; G06V 30/1444; G06T 7/00
See application file for complete search history.

(56) References Cited

U.S. PATENT DOCUMENTS

2019/0012790 A1* 1/2019 Aoba ................... G06V 10/751
2019/0340416 A1* 11/2019 Cao ......................... G06F 17/15
(Continued)

OTHER PUBLICATIONS

International Search Report and Written Opinion dated Aug. 13, 2019 for PCT/JP2019/021679 filed on May 31, 2019, 4 pages.
(Continued)

*Primary Examiner* — Dhaval V Patel
(74) *Attorney, Agent, or Firm* — Xsensus LLP (57) ABSTRACT

A learning device acquires a plurality of images from a storage. The learning device trains a feature extraction part using a plurality of images. The learning device causes the trained feature extraction part to output a feature map of each of one or more images among the plurality of images. The learning device inputs the output feature map to a coordinate estimation part for each of one or more images, and causes the coordinate estimation part to output at least one set of coordinates of a region of a portion where the object is present in the image. The learning device extracts an image of a portion indicated by the output coordinates from the image, for each of one or more images. The learning device further trains the trained feature extraction part using the extracted image.

20 Claims, 6 Drawing Sheets

(51) Int. Cl.
*G06V 10/22* (2022.01)
*G06N 3/08* (2006.01)

(56) References Cited

U.S. PATENT DOCUMENTS

| | | | |
|---|---|---|---|
| 2021/0133474 A1* | 5/2021 | Sawada | G06V 10/82 |
| 2021/0150702 A1* | 5/2021 | Claessen | G06T 17/10 |
| 2021/0174149 A1* | 6/2021 | Zhou | G06N 3/08 |
| 2021/0209396 A1* | 7/2021 | Miyano | G06T 7/00 |

OTHER PUBLICATIONS

Padmanabhan, S., "Convolutional Neural Networks for Image Classification and Captioning," Jul. 9, 2018, 8 pages.

* cited by examiner

LEARNING DEVICE, CLASSIFICATION DEVICE, LEARNING METHOD, CLASSIFICATION METHOD, LEARNING PROGRAM, AND CLASSIFICATION PROGRAM

CROSS-REFERENCE TO RELATED APPLICATION

The present application is based on PCT filing PCT/JP2019/021679, filed May 31, 2019, the entire contents of which are incorporated herein by reference.

TECHNICAL FIELD

The present invention relates to an image processing method using machine learning, and more particularly to a technical field of a learning method and a classification method for classifying objects present in an image using a convolutional neural network.

BACKGROUND ART

Currently, research and development relating to deep learning is actively conducted. Particularly in the technical field of computer vision, convolutional neural networks are generally employed as models for processing an image. This network has a plurality of convolution layers, and repeats a convolution operation on an image to generate a feature map of the image. From this feature map, classification or the like of an object present in the image is performed (for example, Non Patent Literature 1).

CITATION LIST

Non Patent Literature

Non Patent Literature 1: Sachin Padmanabhan, "Convolutional Neural Networks for Image Classification and Captioning", [online], [searched Jul. 9, 2018], Internet <URL: https://web.stanford.edu/class/cs231a/prev_projects_2016/ex ample_paper.pdf>

SUMMARY OF INVENTION

Technical Problem

In order to improve an accuracy of classification, a large number of images are required for learning. However, it may be difficult to prepare a large number of images in advance. Further, in a case where a plurality of objects are present in one image, it is desired to classify each object.

The present invention has been made in view of the above points, and one example of the object is to provide a learning device, a classification device, a learning method, a classification method, a learning program, and a classification program which can improve the classification accuracy by automatically increasing the number of images for learning and can generate a model for classifying each of a plurality of objects present in the image.

Solution to Problem

In order to solve the above problem, an aspect of the present invention is a learning device comprising: a generation means that generates a model for classifying one or more objects, the model including a feature extraction part that includes a plurality of convolution layers and outputs a feature map of an image in which the one or more objects are present, and a coordinate estimation part that outputs coordinates of a region of a portion, in the image, where the object is present; and a storage control means that stores the generated model in a model storage means, wherein the generation means includes an image acquisition means that acquires a plurality of images in each of which one or more objects are present, from an image storage means, a first training means that trains the feature extraction part using the plurality of acquired images, a feature map output control means that causes the feature extraction part trained by the first training means to output a feature map of each of one or more images among the plurality of images, a coordinate output control means that inputs the output feature map to the coordinate estimation part for each of the one or more images, and causes the coordinate estimation part to output at least one set of coordinates of a region of a portion where the object is present in the image, an extraction means that extracts, for each of the one or more images, an image of a portion indicated by the output coordinates from the image, and a second training means that further trains the feature extraction part trained by the first training means, using the extracted image.

According to the invention, an image corresponding to one or more regions of one or more portions in which one or more objects are present are extracted from the image used for initial learning by the feature extraction part. Accordingly, it is possible to automatically increase the number of images in which the positions or the ratios of regions occupied by the objects are different from those in the images used for initial learning. It is possible to improve the classification accuracy by further training the feature extraction part using those images, and generate a model for classifying each of a plurality of objects present in the image.

Another aspect of the present invention is the learning device, wherein the model further includes at least one class estimation part that outputs class information indicating a class of each of the one or more objects based on the feature map, the first training means trains the feature extraction part and a predetermined first class estimation part among the at least one class estimation part using the plurality of acquired images, and the second training means trains the feature extraction part and a predetermined second class estimation part among the at least one class estimation part using the plurality of acquired images.

Yet another aspect of the present invention is the learning device, wherein the second class estimation part is a class estimation part different from the first class estimation part among the at least one class estimation part.

According to the invention, since the first class estimation part used for initial learning by the feature extraction part and the second class estimation part used for second learning by the feature extraction part are different, it is possible to improve the classification accuracy in a case where the tendency of the extracted images is different from the tendency of the original images.

Yet another aspect of the present invention is the learning device, wherein the second class estimation part is the same as the first class estimation part.

According to the invention, since the first class estimation part used for initial learning by the feature extraction part and the second class estimation part used for second learning by the feature extraction part are the same, it is possible to improve the classification accuracy in a case where the tendency of the extracted images is the same or similar to the tendency of the original images.

Yet another aspect of the present invention is the learning device, wherein the coordinate output control means causes, for an image in which a plurality of objects are present among the plurality of images, the coordinate estimation part to output at least one set of coordinates of a region in which each of a plurality of objects are present.

According to the invention, since an image is extracted for each object, it is possible to further increase the number of images for learning.

Yet another aspect of the present invention is the learning device, wherein the coordinate output control means causes the coordinate estimation part to output coordinates of each of a plurality of different regions, for at least one object among the one or more objects.

According to the invention, it is possible to increase the number of various images for one object, as the image for learning.

Yet another aspect of the present invention is a classification device comprising: a reading means that reads, from a storage means that stores the model generated by the learning device, the model; a feature map output control means that causes the feature extraction part included in the read model to output a feature map of a given image in which one or more objects are present; and a class information output control means that causes the read model to output class information indicating a class of each of the one or more objects based on the output feature map of the given image.

According to the invention, since the model including the feature extraction part trained using the initially prepared images and the images extracted from those images is used, it is possible to improve the classification accuracy of a plurality of objects present in the image.

Yet another aspect of the present invention is a learning method executed by a computer, the method comprising: a generation step of generating a model for classifying one or more objects, the model including a feature extraction part that includes a plurality of convolution layers and outputs a feature map of an image in which the one or more objects are present, and a coordinate estimation part that outputs coordinates of a region of a portion, in the image, where the object is present; and a storage control step of storing the generated model in a model storage means, wherein the generation step includes an image acquisition step of acquiring a plurality of images in each of which one or more objects are present, from an image storage means, a first training step of training the feature extraction part using the plurality of acquired images, a feature map output control step of causing the feature extraction part trained in the first training step to output a feature map of each of one or more images among the plurality of images, a coordinate output control step of inputting the output feature map to the coordinate estimation part for each of the one or more images, and causing the coordinate estimation part to output at least one set of coordinates of a region of a portion where the object is present in the image, an extraction step of extracting, for each of the one or more images, an image of a portion indicated by the output coordinates from the image, and a second training step of further training the feature extraction part trained in the first training step, using the extracted image.

Yet another aspect of the present invention is a classification method executed by a computer, the method comprising: a reading step of reading, from a storage means that stores the model generated by the learning device, the model; a feature map output control step of causing the feature extraction part included in the read model to output a feature map of a given image in which one or more objects are present; and a class information output control step of causing the read model to output class information indicating a class of each of the one or more objects based on the output feature map of the given image.

Yet another aspect of the present invention is a learning program executed by a computer, the program causing the computer to function as: a generation means that generates a model for classifying one or more objects, the model including a feature extraction part that includes a plurality of convolution layers and outputs a feature map of an image in which the one or more objects are present, and a coordinate estimation part that outputs coordinates of a region of a portion, in the image, where the object is present; and a storage control means that stores the generated model in a model storage means, wherein the generation means includes an image acquisition means that acquires a plurality of images in each of which one or more objects are present, from an image storage means, a first training means that trains the feature extraction part using the plurality of acquired images, a feature map output control means that causes the feature extraction part trained by the first training means to output a feature map of each of one or more images among the plurality of images, a coordinate output control means that inputs the output feature map to the coordinate estimation part for each of the one or more images, and causes the coordinate estimation part to output at least one set of coordinates of a region of a portion where the object is present in the image, an extraction means that extracts, for each of the one or more images, an image of a portion indicated by the output coordinates from the image, and a second training means that further trains the feature extraction part trained by the first training means, using the extracted image.

Yet another aspect of the present invention is a classification program for causing a computer to function as: a reading means that reads, from a storage means that stores the model generated by the learning device, the model; a feature map output control means that causes the feature extraction part included in the read model to output a feature map of a given image in which one or more objects are present; and a class information output control means that causes the read model to output class information indicating a class of each of the one or more objects based on the output feature map of the given image.

Advantageous Effects of Invention

According to the present invention, it is possible to improve the classification accuracy by automatically increasing the number of images for learning, and generate a model for classifying each of a plurality of objects present in the image.

DESCRIPTION OF EMBODIMENTS

Hereinafter, embodiments of the present invention will be described in detail with reference to the drawings. The embodiments described below are embodiments in a case where the present invention is applied to an image processing device which executes learning for generating a model which is for estimating a class of an object present in an image, and classifies an object using the generated model. Note that, a device for executing learning and a device for estimating a class may be separate devices.

[1. Configuration of Image Processing Device]

Figure 1:
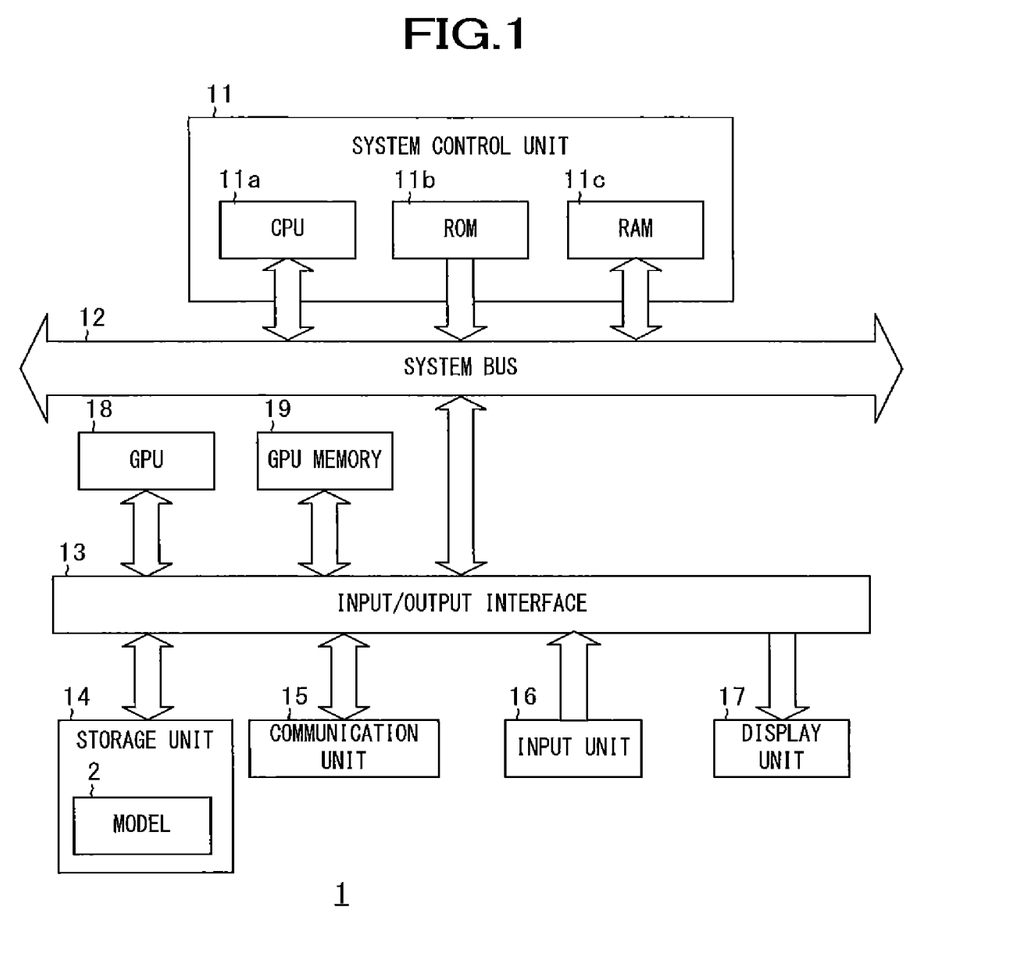
FIG. 1 is a block diagram showing an example of a schematic configuration of an image processing device 1 according to an embodiment.

First, the configuration of an image processing device 1 will be described using FIG. 1. FIG. 1 is a block diagram showing an example of a schematic configuration of the image processing device 1 according to the embodiment. As shown in FIG. 1, the image processing device 1 includes a system controller 11, a system bus 12, an input/output interface 13, a storage unit 14, a communication unit 15, an input unit 16, a display unit 17, a graphics processing unit (GPU) 18, and a GPU memory 19 (or video RAM). The system controller 11 and the input/output interface 13 are connected via the system bus 12. The image processing device 1 may be, for example, a server device or a personal computer.

The system controller 11 includes a central processing unit (CPU) 11a, a read only memory (ROM) 11b, a random access memory (RAM) 11c, and the like.

The input/output interface 13 performs interface processing between the system controller 11 and the storage unit 14 to the GPU memory 19.

The storage unit 14 is configured by, for example, a hard disk drive, a solid-state drive or the like. The storage unit 14 stores a generated model 2, a plurality of pieces of training data used for generating the model 2, and the like. The storage unit 14 further stores an operating system, a model generation program, a classification program, and the like. For example, the training data and various programs may be acquired from a predetermined computer via a network, or may be recorded in a recording medium such as an optical disk, a memory card, a magnetic tape, or the like and read via a drive device. In a case where the device for generating the model 2 and the device for performing classification are separate devices, the transfer of the generated model 2 may be performed via a network or a recording medium.

The communication unit 15 is configured by, for example, a network interface controller or the like. The communication unit 15 is connected to another computer via a predetermined network such as the Internet or a local area network (LAN), and controls a communication state with the computer.

The input unit 16 receives an operation by an operator and outputs a signal corresponding to the operation contents to the system controller 11. Examples of the input unit 16 include a keyboard, a mouse, a touch panel, and the like.

The display unit 17 includes, for example, a graphic controller, a display, and the like. The display unit 17 displays information such as images and characters under the control of the system controller 11. Examples of display panels include liquid crystal panels, organic light emitting (EL) panels, and the like.

The GPU 18 executes a matrix operation or the like in machine learning under the control of the system controller 11. The GPU 18 performs pipeline processing for a plurality of operations in parallel. The GPU 18 and the GPU memory 19 are connected. The GPU memory 19 stores data used for calculation by the GPU 18 and calculation results.

[2. Overview of Functions of System Control Unit of Image Processing Device]

Figure 2:
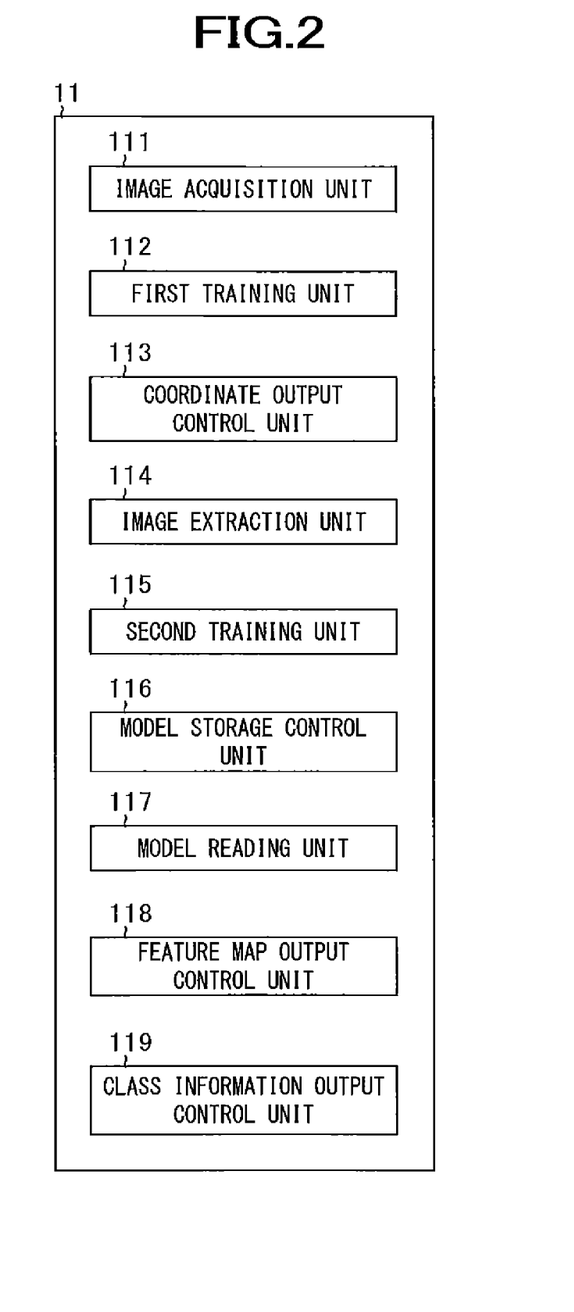
FIG. 2 is a diagram showing an example of functional blocks of a system control unit 11 and a GPU 18 of the image processing device 1 according to an embodiment.

Next, an overview of functions of the system control unit 11 and the GPU 18 will be described using FIGS. 2 to 4B. FIG. 2 is a diagram showing an example of functional blocks of the system control unit 11 and the GPU 18 of the image processing device 1 according to the embodiment. By the CPU 11a reading and executing various codes or the like included in the program stored in the storage unit 14, as shown in FIG. 2, the system control unit 11 and the GPU 18 function as an image acquisition unit 111, a first training unit 112, a coordinate output control unit 113, an image extraction unit 114, a second training unit 115, a model storage control unit 116, a model reading unit 117, a feature map output control unit 118, a class information output control unit 119, and the like.

[2-1. Model Generation]

Figure 3:
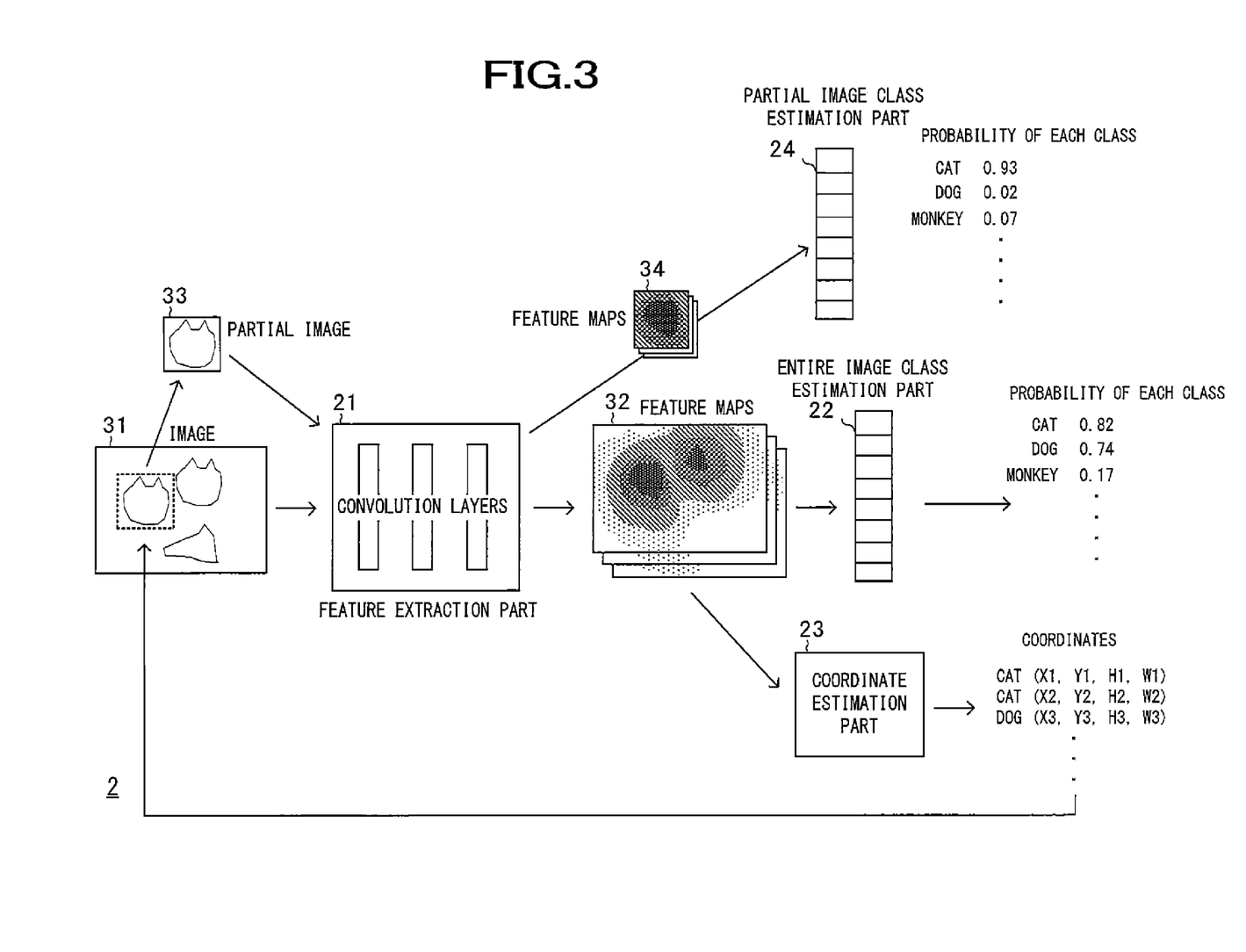
FIG. 3 is a diagram illustrating a configuration example of a model 2.

FIG. 3 is a diagram illustrating a configuration example of the model 2. The image acquisition unit 111 to the second training unit 115 generate the model 2 by machine learning. As shown in FIG. 3, the model 2 is a convolutional neural network including a feature extraction part 21, an entire image class estimation part 22, a coordinate estimation part 23, and a partial image class estimation part 24. Examples of network models on which the model 2 is based include ResNet, GoogleNet, AlexNet, and VGGNet.

The feature extraction part 21 includes a plurality of convolution layers. The feature extraction part 21 outputs feature maps 32 of an image 31 input to the model 2. One or more objects are present in the image 31. In a case where a plurality of objects are present in the image 31, classes of the objects may be the same as or different from each other. The feature extraction part 21 repeats a convolution operation for the image 31 using, for example, the convolution layers, and outputs the feature map 32 for each class that the model 2 can classify. The feature extraction part 21 may appropriately include layers such as pooling layers.

The entire image class estimation part 22 outputs class information indicating one or more class of one or more objects present in the image 31 based on the feature maps 32 output from the feature extraction part 21. The class estimation part 22 includes one or more fully connected layers. The class estimation part 22 converts the feature maps 32 using a fully connected layer, and outputs, for each class, information indicating whether an object of the corresponding class is present, as class information. The entire image class estimation part 22 may include, for example, one fully connected layer or a plurality of fully connected layers connected in series, for each class. For example, a feature map 32 corresponding to a certain class i is referred to as a feature map 32-$i$, and a fully connected layer corresponding to the class i is referred to as a fully connected layer i. The fully connected layer i combines the elements in the feature map 32-$i$ and outputs the probability value of each class. For example, in a case where the probability value of the class i, among the probability values is equal to or greater than a predetermined value, it is estimated that the object of the class i is present in the image 31. In a case where objects of a plurality of classes are present in the image 31, the entire image class estimation part 22 can estimate that the object of each of these classes is present. In the classification stage after learning is completed, the probability value of each class is converted to 0 or 1, for example. For example, a probability value equal to or greater than a predetermined value is converted to 1, and a probability value less than the predetermined value is converted to 0.

Figure 4:
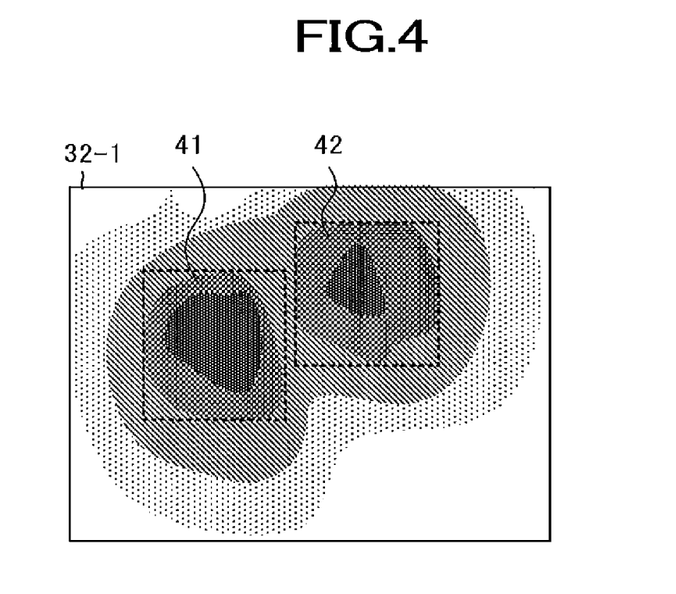
FIG. 4 is a diagram showing a setting example of a bounding box by a coordinate estimation part 23.

The coordinate estimation part 23 outputs coordinate data of a region of a portion where one or more objects are present in the image 31 based on the feature map 32 output from the feature extraction part 21. For example, the coordinate estimation part 23 specifies a region in which the object of the class i is present, from the feature map 32-i, and sets a bounding box corresponding to the region. Each array element constituting the feature map 32-i stores a value indicating the probability that an object of the class i is present at the coordinates that the element corresponds to in the image 31. Therefore, the coordinate estimation part 23 may specify a region composed of elements having a value equal to or greater than a predetermined threshold value from the feature map 32-i as a region where the object of class i is present. The bounding box is, for example, a rectangular region. For each set bounding box, the coordinate estimation part 23 outputs the coordinate data of the bounding box and the class i corresponding to the used feature map 32-i. The coordinate data may include, for example, the coordinates of the center of the bounding box, and the height and width of the bounding box. FIG. 4 is a diagram showing a setting example of the bounding box by the coordinate estimation part 23. For example, two objects of a class 1 are present in a certain image 31. As shown in FIG. 4, in the feature map 32-1, two regions composed of elements having a value equal to or greater than the threshold value are specified, and bounding boxes 41 and 42 corresponding to these regions are set.

The partial image class estimation part 24 outputs class information indicating the class of one or more objects present in an image 33 based on the feature maps 32 output from the feature extraction part 21 for the image 33 extracted from the image 31 as described below. For example, the structure of the partial image class estimation part 24 may be the same as the structure of the entire image class estimation part 22. Alternatively, in a case where only the image 33 in which only one object is present is extracted from the image 31, the partial image class estimation part 24 may have a structure corresponding to this. The entire image class estimation part 22 and the partial image class estimation part 24 may be the same or different class estimation parts. That is, the model 2 includes at least one class estimation part that estimates the class of the object based on the feature map.

In order to generate the model 2 described above, the image acquisition unit 111 acquires a plurality of images 31 from the storage unit 14 as the first training data. The image 31 is an image that is captured and prepared in advance, for example. For each image 31, the image acquisition unit 111 further acquires a label (ground truth) indicating the class of the object present in the image 31 from the storage unit 14, and associates the label with the image 31.

The first training unit 112 trains the feature extraction part 21 using the images 31 as the first training data acquired by the first training data acquisition unit 111. The processing by the first training unit 112 is automatically executed in response to the acquisition of the image 31 by the image acquisition unit 111, for example. Here, the first training unit 112 trains the feature extraction part 21 and a predetermined first class estimation part among at least one class estimation part included in the model 2. In the present embodiment, the first class estimation part is the entire image class estimation part 22. The first training unit 112 performs, as the feature extraction part 21 and the entire image class estimation part 22, arithmetic processing corresponding to these layers, and outputs the probability of each class. Specifically, the first training unit 112 inputs the image 31 to the feature extraction part 21, and causes the feature extraction part 21 to output feature maps 32. The first training unit 112 inputs the feature maps 32 to the entire image class estimation part 22, and causes the entire image class estimation part 22 to output class information. The first training unit 112 calculates classification errors by comparing the class information with the label of the class. The first training unit 112 updates the weight and bias parameters held by the entire image class estimation part 22 using the classification error. Further, the first training unit 112 updates the weight and bias held by the feature extraction part 21 by back-propagating the errors from the entire image class estimation part 22.

The coordinate output control unit 113 causes the feature extraction part 21 trained by the first training unit 112 to output the feature maps 32 of each of one or more images among the plurality of images 31. The processing by the coordinate output control unit 113 is automatically executed in response to the completion of the training by the first training unit 112, for example. The coordinate output control unit 113 inputs the feature maps output from the feature extraction part 21 to the coordinate estimation part 23 for each of one or more images 31, and causes the coordinate estimation part 23 to output coordinates of at least one of region of a portion where one or more objects are present in the image 31. That is, the coordinate output control unit 113 causes the coordinate estimation part 23 to output at least one piece of coordinate data of the bounding box, for each of one or more images 31. For example, the coordinate output coordinate output control unit 113 outputs the coordinate data and the class of the object in the bounding box, for each bounding box. It is sufficient that the coordinate output control unit 113 inputs, to the coordinate estimation part 23, only the feature map 32 corresponding to the class indicated by the label, among the total feature maps 32 output from the feature extraction part 21. That is, the coordinate data and the class of the object are output using the feature map 32 corresponding to the object present in the image 31.

In a case where a plurality of objects are present in the image 31, the coordinate output control unit 113 may cause coordinates of regions in each of which the plurality of objects are present to be output, cause coordinates for one object to be output, or cause coordinates for some objects among the plurality of objects to be output. In a case where a plurality of objects of the same class are present in the image 31, a plurality of regions composed of elements having a value equal to or greater than the threshold value are specified by the coordinate estimation part 23 from the feature map 32 corresponding to the class. In a case where objects of different classes are present in the image 31, each region composed of elements having a value equal to or greater than the threshold value is specified from the feature map 32 corresponding to each class.

Figure 5A:
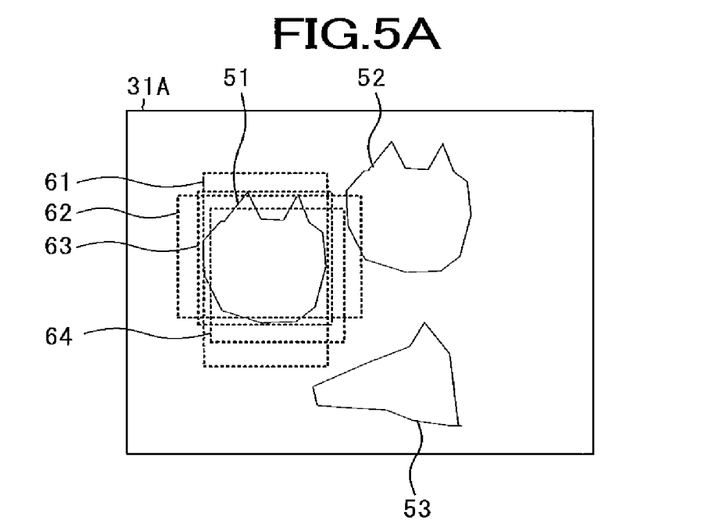
FIG. 5A is a diagram showing a setting example of abounding boxes by the coordinate estimation part 23.

The coordinate output control unit 113 may output the coordinates of each of a plurality of different regions for at least one object. The plurality of different regions are regions of which at least one of the size, the aspect ratio, and the coordinates of the center is different, for example. For example, the coordinate output control unit 113 can change the size or the coordinates of the center by changing the threshold value for specifying the region where the object is present. In addition, the coordinate output control unit 113 can change the aspect ratio by preparing a plurality of boxes of which the aspect ratio is different in advance and applying each of the boxes to the specified region. FIG. 5A is a diagram showing a setting example of the bounding boxes by the coordinate estimation part 23. As shown in FIG. 5A, objects 51 to 53 are present in a certain image 31A. For example, bounding boxes 61 to 64 are set for the object 51.

Figure 5B:
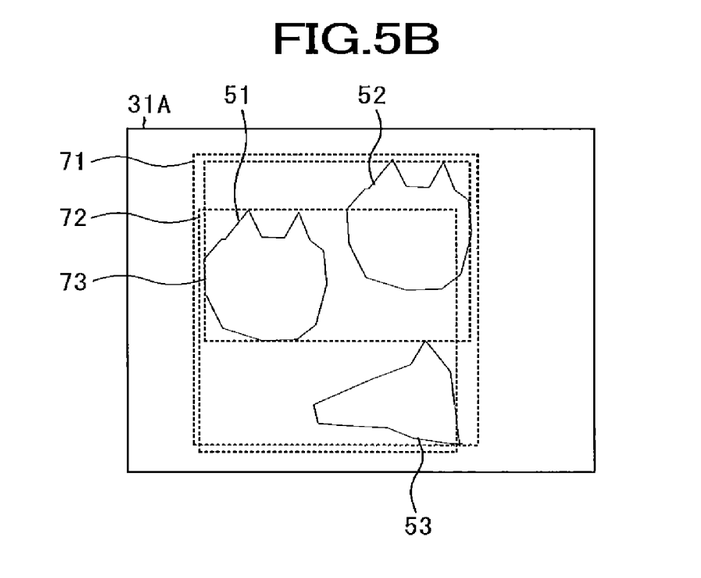
FIG. 5B is a diagram showing a setting example of bounding boxes by the coordinate estimation part 23.

For the image 31 where a plurality of objects are present, the coordinate output control unit 113 may cause coordinates of at least one region of a portion, where two or more objects among the plurality of objects are present, to be output. In this case, coordinates of one region may be output for a combination of the same objects, or a plurality of sets of coordinates of a plurality of different regions may be output for the combination of the same object. In addition, coordinates of a region of a portion where two or more objects are present may be output, and for at least one object, coordinates of a region where only the one object is present may be output. FIG. 5B is a diagram showing a setting example of the bounding boxes by the coordinate estimation part 23. For example, in the example shown in FIG. 5B, in the image 31A, a bounding box 71 (a part of the image 31A) including the objects 51 to 53, a bounding box 72 including the objects 51 and 53, and a bounding box 73 including the objects 51 and 52 are set.

For one or more images 31 of which the coordinates are output from the coordinate estimation part 23, the image extraction unit 114 extracts an image of a portion indicated by the output coordinates, as the partial image 33. The processing by the image extraction unit 114 may be automatically executed every time the coordinates are output from the coordinate output control unit 113, for example, or may be automatically executed after the output of all of the coordinates is completed. The image extraction unit 114 specifies an area to be extracted and extracts the partial image 33 based on the coordinate data output from the coordinate estimation part 23. For each of the extracted partial images 33, the image extraction unit 114 stores the partial image 33 and the class of which the coordinates are output from the coordinate estimation part 23, in the storage unit 14 as the second training data. In this manner, it is possible to obtain, as images for learning by the feature extraction part 21, the images 33 different from the images 31. That is, the number of images for learning is automatically increased. Even if the same object as the object present in the image 31 is present in the partial image 33, at least one of the position and the ratio of a region occupied by the object to the image is different between the image 31 and the partial image 33. Therefore, the feature extraction part 21 is further enhanced using the image 33.

The second training unit 115 further trains the feature extraction part 21 trained by the first training unit 112, using the image 33 as the second training data extracted by the image extraction unit 114. The processing by the second training unit 115 is automatically executed in response to the completion of the extraction of all of the partial images 33 by the image extraction unit 114, for example. Here, the second training unit 115 trains the feature extraction part 21 and a predetermined second class estimation part among at least one class estimation part included in the model 2. In the present embodiment, the second class estimation part is the partial image class estimation part 24. The second training unit 115 performs, as the feature extraction part 21 and the partial image class estimation part 24, arithmetic processing corresponding to these layers. A specific training method may be the same as the training by the first training unit except that the class estimation part to be trained is the partial image class estimation part 24. By this training, the feature extraction part 21 is further enhanced, and thus the classification accuracy by the model 2 is improved.

As described above, the first class estimation part and the second class estimation part included in the model 2 may be different from or same as each other. For example, any configuration may be adopted depending on the tendency of the images 31 and the tendency of the images 33. In a case where the tendencies of the images 31 and 33 are different from each other, the first class estimation part and the second class estimation part may be different from each other. In a case where the tendencies of the images 31 and 33 are the same or similar to each other, the first class estimation part and the second class estimation part may be the same. The image 31 is basically a captured image as it is, and considering that there is no special editing and that there is a high possibility that a plurality of objects are present in the image 31, the ratio of the region occupied by each object to the image 31 tends to be relatively small. In a case where a partial image 33 in which only one object is present is extracted from the image 31, the ratio of a region occupied by the corresponding object to the image 33 tends to be relatively large. In such a case, the first class estimation part and the second class estimation part may be different from each other. In a case where a partial image 33 in which two or more objects are present is extracted from the image 31, or in a case where a bounding box is set to be larger for one object, the ratio of a region occupied by the corresponding object to the image 33 tends to be relatively small. In such a case, the first class estimation part and the second class estimation part may be the same.

In a case where the model 2 is generated through the training of the feature extraction part 21 and the entire image class estimation part 22 by the first training unit 112, and the training of the feature extraction part 21 and the partial image class estimation part 24 by the second training unit 115, the model storage control unit 116 stores the generated model 2 in the storage unit 14.

[2-2. Class Classification]

The model reading unit 117 reads the model 2 stored in the storage unit 14 and loads the model into a RAM 14c or the GPU memory 19.

The feature map output control unit 118 and the class information output control unit 119 perform arithmetic operations corresponding to the feature extraction part 21 and the entire image class estimation part 22, respectively. The feature map output control unit 118 inputs a given image, in which one or more objects to be classified are present, to the feature extraction part 21 included in the read model 2, and causes the feature extraction part 21 to output feature maps of the given image. The given image may be stored in the storage unit 14, for example, or may be acquired via a network or a recording medium.

The class output control unit 119 inputs the feature map output from the feature extraction part 21 to the entire image class estimation part 22 included in the read model 2, and causes the entire image class estimation part 22 to output class information indicating each class of one or more objects present in the given image.

[3. Operation of Image Processing Device]

Figure 6:
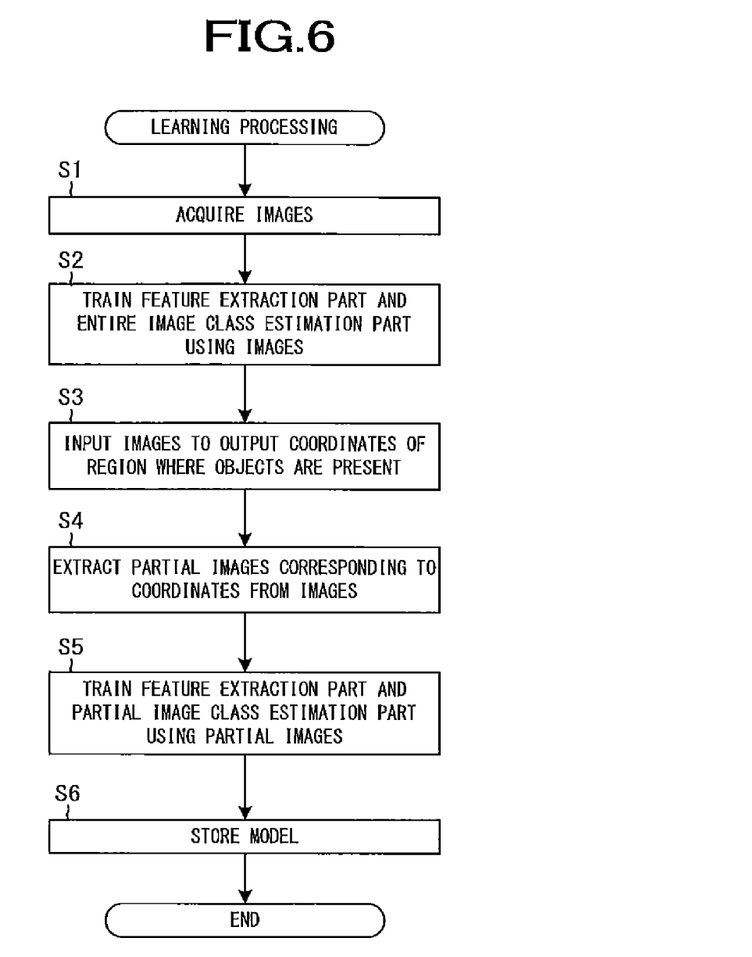
FIG. 6 is a flowchart showing an example of learning processing by the system control unit 11 and the GPU 18 of the image processing device 1.

Next, the operation of the image processing device 1 will be described using FIG. 6. FIG. 6 is a flowchart showing an example of learning processing by the system control unit 11 and the GPU 18 of the image processing device 1. The system control unit 11 and the GPU 18 perform learning processing according to the program codes included in the model generation program.

As shown in FIG. 6, the first training data acquisition unit 111 acquires the image 31 and the label of the class corresponding to the image 31 from the storage unit 14, as the first training data, for each of the plurality of images 31 (step S1).

Next, the first training unit 112 trains the feature extraction part 21 and the entire image class estimation part 22 using the acquired image 31 and the acquired label of the class (step S2). Specifically, the first training unit 112 causes the feature extraction part 21 to output the feature maps 32 for each image 31. The first training unit 112 inputs the feature maps 32 to the entire image class estimation part 22, and causes the entire image class estimation part 22 to output class information. The first training unit 112 calculates a classification errors by comparing the class information with the label of the class. The first training unit 112 updates the parameters of the entire image class estimation part 22 based on the classification errors. Further, the first training unit 112 back-propagates the errors from the entire image class estimation part 22 to the feature extraction part 21, and updates the parameters of the feature extraction part 21. The first training unit 112 ends the training when, for example, the number of epochs reaches a predetermined number or the like.

Then, the coordinate output control unit 113 causes the feature extraction part 21 trained by the first training unit 112 to output the feature maps 32 of each of one or more images 31. The coordinate output control unit 113 inputs the feature maps 32 to the coordinate estimation part 23, and causes the coordinate estimation part 23 to output the coordinate data and the class of the region of a portion where one or more objects are present (step S3). Next, the image extraction unit 114 extracts a partial image 33 indicated by the coordinate data output from the coordinate estimation part 23, from the image 31 (step S4).

Next, the second training unit 115 trains the feature extraction part 21 and the partial image class estimation part 24 using the extracted partial image 33 and the label of the class output from the coordinate estimation part 23 (step S5). Specifically, the second training unit 115 causes the feature extraction part 21 to output the feature maps 32 for each partial image 33. The second training unit 115 inputs the feature maps 32 to the partial image class estimation part 24, and causes the partial image class estimation part 24 to output class information. The second training unit 115 calculates classification errors by comparing the class information with the label of the class. The second training unit 115 updates the parameters of the partial image class estimation part 24 based on the classification errors. Further, the second training unit 115 back-propagates the errors from the partial image class estimation part 24 to the feature extraction part 21, and updates the parameters of the feature extraction part 21. The second training unit 115 ends the training when, for example, the number of epochs reaches a predetermined number or the like. As a result, the model 2 is generated. The model storage control unit 116 stores the generated model 2 in the storage unit 14 (step S6), and ends the learning processing.

As described above, according to the present embodiment, the image processing device 1 generates the model 2 which is for classifying one or more objects and includes the feature extraction part 21 which includes a plurality of convolution layers and outputs a feature map of an image in which one or more objects are present, and the coordinate estimation part 23 that outputs the coordinates of the region of a portion where the object is present, in the image, based on the feature map. Here, the image processing device 1 acquires a plurality of images in each of which one or more objects are present, from the storage unit 14. In addition, the image processing device 1 trains the feature extraction part 21 using a plurality of acquired images. In addition, the image processing device 1 causes the trained feature extraction part 21 to output the feature map of each of one or more images among the plurality of images. In addition, the image processing device 1 inputs the output feature map to the coordinate estimation part 23 for each of one or more images, and causes the coordinate estimation part 23 to output at least one set of coordinates of a region of a portion where the object is present in the image. In addition, the image processing device 1 extracts an image of a portion indicated by the output coordinates from the image, for each of one or more images. In addition, the image processing device 1 further trains the trained feature extraction part 21 using the extracted image. Then, the image processing device 1 stores the generated model 2 in the storage unit 14. Accordingly, it is possible to improve the classification accuracy by automatically increasing the number of images for learning, and generate a model 2 for classifying each of a plurality of objects present in the image.

In addition, the model 2 may further include at least one class estimation part which outputs class information indicating the class of each of one or more objects based on the feature map. The image processing device 1 may train the feature extraction part 21 and a predetermined first class estimation part among at least one class estimation part using a plurality of acquired images. In addition, the image processing device 1 may train the feature extraction part 21 and a predetermined second class estimation part among at least one class estimation part using the extracted images.

Here, the second class estimation part may be a class estimation part different from the first class estimation part, among at least one class estimation part. In this case, since the first class estimation part used for initial learning by the feature extraction part 21 and the second class estimation part used for second learning by the feature extraction part 21 are different, it is possible to improve the classification accuracy in a case where the tendency of the extracted images is different from the tendency of the original images.

In addition, the second class estimation part may be the same as the first class estimation part. In this case, since the first class estimation part used for initial learning by the feature extraction part 21 and the second class estimation part used for second learning by the feature extraction part 21 are the same, it is possible to improve the classification accuracy in a case where the tendency of the extracted images is the same or similar to the tendency of the original images.

In addition, the image processing device 1 may cause the coordinate estimation part 23 to output at least one set of coordinates of a region in which each of a plurality of objects are present for the image in which a plurality of objects are present, among a plurality of images. In this case, since an image is extracted for each object, it is possible to further increase the number of images for learning.

In addition, the image processing device 1 may cause the coordinate estimation part 23 to output coordinates of each of a plurality of different regions for at least one object among one or more objects. In this case, it is possible to increase the number of various images for one object, as the image for learning.

In addition, the image processing device 1 may read the generated model 2 from the storage unit 14. In addition, the image processing device 1 may cause the feature extraction part 21 included in the read model 2 to output a feature map of a given image in which one or more objects are present. In addition, the image processing device 1 may cause the read model 2 to output the class information indicating the class of each of one or more objects based on the output feature map of the given image. In this case, since the model 2 including the feature extraction part 21 trained using the initially prepared images and the images extracted from those images is used, it is possible to improve the classification accuracy of a plurality of objects present in the image.

REFERENCE SIGNS LIST 1 image processing device
11 system control unit
12 system bus
13 input/output interface
14 storage unit
15 communication unit
16 input unit
17 display unit
18 GPU
18 GPU memory
111 image acquisition unit
112 first training unit
113 coordinate output control unit
114 image extraction unit
115 second training unit
116 model storage control unit
117 model reading unit
118 feature map output control unit
119 class information output control unit
2 model
21 feature extraction part
22 entire image class estimation part
23 coordinate estimation part
24 partial image class estimation part

The invention claimed is:

1. An information processing apparatus comprising:
circuitry configured to
generate a model for classifying one or more objects present in an image, the model including computer-executable instructions, which when executed by the circuitry causes the circuitry to perform
feature extraction, wherein the feature extraction includes a plurality of convolution layers and outputs at least one feature map of the image, and
coordinate estimation, wherein the coordinate estimation is configured to output coordinates of at least one region, in the image, where at least one of the one or more objects is present; and
a computer-readable medium configured to store the model, wherein
the circuitry is configured to
acquire a plurality of first images from a computer-readable medium, one or more objects being present in each of the plurality of first images,
first train the feature extraction based on the plurality of acquired first images,
cause the feature extraction trained based on the plurality of first images to output at least one feature map of each of one or more second images among the plurality of first images,
input, for each of the one or more second images, the at least one output feature map to the coordinate estimation causing the coordinate estimation to output coordinates of at least one region, in the second image, where at least one of the one or more objects is present,
extract, for each of the one or more second images, one or more third images from the second image, the one or more third images corresponding to the at least one region indicated by the output coordinates, and
second train the feature extraction based on the one or more extracted third images.

2. The information processing apparatus of claim 1, wherein
the model further includes at least one class estimation configured to output class information indicating a class of each of the one or more objects based on the at least one feature map.

3. The information processing apparatus of claim 2, wherein
the first training includes training the feature extraction and a predetermined first class estimation among the at least one class estimation based on the plurality of acquired first images.

4. The information processing apparatus of claim 3, wherein
the second training includes training the feature extraction and a predetermined second class estimation among the at least one class estimation based on the one or more extracted third images.

5. The information processing apparatus of claim 4, wherein
the second class estimation is different from the first class estimation.

6. The information processing apparatus of claim 4, wherein
the second class estimation is the same as the first class estimation.

7. The information processing apparatus of claim 1, wherein
the circuitry is configured to output, for an image in which a plurality of objects are present among the plurality of first images, coordinates of at least one region in which each of the plurality of objects is present.

8. The information processing apparatus of claim 1, wherein
the circuitry is configured to cause the coordinate estimation to output coordinates of each of a plurality of different regions, for at least one object among the one or more objects.

9. An information processing apparatus comprising:
circuitry configured to
read the model generated according to claim 1; and
execute the model to
output at least one feature map of a given image in which one or more objects are present; and
output class information indicating a class of each of the one or more objects based on the output at least one feature map of the given image.

10. A learning method executed by a computer, the method comprising:
generating a model for classifying one or more objects present in an image, the model including
feature extraction, wherein the feature extraction includes a plurality of convolution layers and output at least one feature map of the image, and
coordinate estimation, wherein the coordinate estimation is configured to output coordinates of at least one region, in the image, where at least one of the one or more objects is present; and storing the model in a computer-readable medium, wherein
generating the model includes
acquiring a plurality of first images, from a computer-readable medium, one or more objects being present in each of the plurality of first images,
first training feature extraction based on the plurality of acquired first images,
causing the feature extraction trained based on the plurality of acquired first images to output at least one feature map of each of one or more second images among the plurality of first images,
inputting, for each of the one or more second images, the at least one output feature map to the coordinate estimation and causing the coordinate estimation to output coordinates of at least one region, in the second image, where at least one of the one or more objects is present,
extracting, for each of the one or more second images, one or more third images from the second image, the one or more third images corresponding to the at least one region indicated by the output coordinates, and
second training the feature extraction trained based on the one or more extracted third images.

11. The method of claim 10, wherein
the model further includes at least one class estimation configured to output class information indicating a class of each of the one or more objects based on the at least one feature map.

12. The method of claim 10, wherein
the first training includes training the feature extraction and a predetermined first class estimation among the at least one class estimation based on the plurality of acquired first images.

13. The method of claim 12, wherein
the second training includes training the feature extraction and a predetermined second class estimation among the at least one class estimation based on the one or more extracted third images.

14. The method of claim 13, wherein
the second class estimation is different from the first class estimation.

15. The method of claim 13, wherein
the second class estimation is the same as the first class estimation.

16. The method of claim 11, wherein
generating the model includes outputting, for an image in which a plurality of objects are present among the plurality of first images, coordinates of at least one region in which each of the plurality of objects is present.

17. The method of claim 10, wherein
generating the model includes outputting coordinates of each of a plurality of different regions, for at least one object among the one or more objects.

18. A classification method executed by a computer, the method comprising:
reading the model generated according to method of claim 10;
causing the feature extraction included in the model to output at least one feature map of a given image in which one or more objects are present; and
causing the model to output class information indicating a class of each of the one or more objects based on the output at least one feature map of the given image.

19. A non-transitory computer readable medium storing thereon a learning program, which when executed by a computer, causes the computer to:
generate a model for classifying one or more objects present in an image, the model including
feature extraction, wherein the feature extraction includes a plurality of convolution layers and output at least one feature map of the image, and
coordinate estimation, wherein the coordinate estimation is configured to output coordinates of at least one region, in the image, where at least one of the one or more objects is present; and
store the model in a computer-readable medium, wherein
generating the model includes
acquiring a plurality of first images, from a computer-readable medium, one or more objects being present in each of the plurality of first images,
first training feature extraction based on the plurality of acquired first images,
causing the feature extraction trained based on the plurality of acquired first images to output at least one feature map of each of one or more second images among the plurality of first images,
inputting, for each of the one or more second images, the at least one output feature map to the coordinate estimation and causing the coordinate estimation to output coordinates of at least one region, in the second image, where at least one of the one or more objects is present,
extracting, for each of the one or more second images, one or more third images from the second image, the one or more third images corresponding to the at least one region indicated by the output coordinates, and
second training the feature extraction trained based on the one or more extracted third images.

20. A non-transitory computer readable medium storing thereon a classification program, which when executed by a computer, causes the computer to:
read the model generated according to claim 19;
cause the feature extraction included in the model to output at least one feature map of a given image in which one or more objects are present; and
cause the model to output class information indicating a class of each of the one or more objects based on the output at least one feature map of the given image.

* * * * *